UNITED STATES PATENT OFFICE.

THILO KROEBER, OF BASEL, SWITZERLAND, ASSIGNOR TO THE FIRM OF "SOCIETY OF CHEMICAL INDUSTRY IN BASLE," OF BASEL, SWITZERLAND.

DISAZO DYE AND PROCESS OF MAKING SAME.

No. 823,793.     Specification of Letters Patent.     Patented June 19, 1906.

Application filed January 3, 1906. Serial No. 294,473.

*To all whom it may concern:*

Be it known that I, THILO KROEBER, chemist and doctor of philosophy, a subject of the Duke of Saxe-Altenburg, and a resident of Basel, Switzerland, have invented new and useful Improvements in the Manufacture of Disazo Dyestuffs, of which the following is a clear and complete specification.

The invention relates to the manufacture of disazo dyestuffs by combining one molecule of the tetrazo derivative of diamidophenol ($OH:NH_2:NH_2 = 1:2:4$) first with one molecule of an azo coloring-matter compound—as, for instance, a sulfonated naphtholic compound—to produce an intermediate product, which is afterward combined with a second molecule of an azo coloring-matter compound—as, for instance, a non-sulfonated naphtholic compound. As sulfonated naphtholic compounds may be employed the 1:4 naphthol-sulfonic acid, 1:5 or 2:6 naphthol-sulfonic acid, a sulfo derivative of 1:8 dioxynaphthalene, &c., and as non-sulfonated naphtholic compound beta-naphthol 2:7 or 1:5 dioxynaphthalene are preferably employed.

The new dyestuffs correspond to the formula

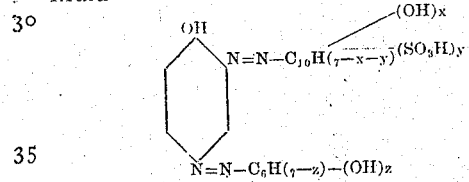

They dye wool in an acid-bath from brown to violet tints, which turn to black on treatment with chromium compounds. They dissolve in water with a coloration varying from violet and blue to black and in concentrated sulfuric acid with a blue to black coloration.

Example: 12.5 parts, by weight, of diamidophenol ($NH_2:NH_2:OH = 1:3:4$) used in the form of the chlorhydrate or sulfate are dissolved in one hundred and fifty parts, by weight, of hot water, then cooled down, by means of ice, and after the addition of thirty parts, by weight, of hydrochloric acid of 20° Baumé, fourteen parts, by weight, of sodium nitrate dissolved in a small quantity of water are gradually added at a low temperature—as, for example, 0° centigrade. The liquid assumes a reddish-orange coloration. The diazotization being complete, the mass is poured into a cold watery solution containing twenty-five parts, by weight, of the sodium salt of 1:4 naphthol-sulfonic acid and fifty parts, by weight, of crystallized sodium acetate. Immediately an intermediate product is formed and precipitated as a gelatinous red paste. As soon as the tetrazophenol has entered into reaction the whole is combined at ordinary temperature with fifteen parts, by weight, of beta-naphthol dissolved in one hundred parts, by weight, of water, with the addition of forty parts, by weight, of soda-lye of 30° Baumé. The combination is now stirred for about five to six hours, then further stirred during about two hours at about 45° centigrade, then heated at about 80° centigrade, and the dyestuff is salted out in the usual manner. If necessary, it may be purified by dissolving the same in hot water and salting out with common salt. It forms in a dry and pulverized state a dark powder with bronze-like luster, soluble in hot water with a bluish-violet color and in concentrated sulfuric acid (66° Baumé) with a dark-blue color, violet-black flakes being precipitated on the addition of sufficient ice-water to the aforesaid solution. The dyestuff produces on wool in an acid-bath brownish-violet shades, which turn to a deep violet-black on the treatment with potassium bichromate and exhibit then very great fastness to milling, washing, potting, and light.

In the aforesaid example the employment of sodium acetate may be omitted, and it can be proceeded in such a manner that the said tetrazophenol solution is combined directly with the naphthol-sulfonic acid solution in the presence of soda-lye (forty parts, by weight) and then immediately with the solution of fifteen parts, by weight, of beta-naphthol dissolved in the necessary quantity of soda-lye.

In an analogous manner valuable dyestuffs with quite similar properties are obtained if in the above example the sodium salt of the 1:4 naphthol-sulfonic acid is replaced by the equivalent quantity of 1:5 naphthol-sulfonic acid or 2:6 naphthol-sulfonic acid or a sulfonic acid of 1:8 dioxynaphthalene and if the beta-naphthol is replaced by the corresponding quantity of a dioxynaphthalene—as, for example, 2:7 or 1:5 dioxynaphthalene.

What I claim is—

1. The process for the manufacture of disazo dyestuffs, which consists in combining one molecule of the tetrazo derivative of the diamidophenol (OH:NH$_2$:NH$_2$ = 1:2:4) with one molecule of an azo coloring-matter compound to form an intermediate product and then combining the intermediate product thus obtained with a further molecule of an azo coloring-matter compound, as described.

2. The process for the manufacture of disazo dyestuffs which consists in combining one molecule of the tetrazo derivative of the diamidophenol (OH:NH$_2$:NH$_2$ = 1:2:4) first with one molecule of a sulfonated naphtholic compound to form an intermediate product and then combining the intermediate product thus obtained with one molecule of a non-sulfonated naphtholic compound as described.

3. As new products, the disazo dyestuffs corresponding to the formula:

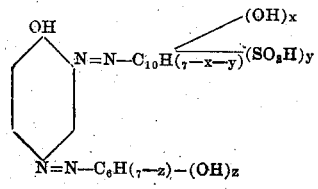

which dye wool in an acid-bath brown to violet tints, which turn to black by treatment with chromium compounds and constitute in dry state dark powders soluble in water with a coloration varying from violet and blue to black and in concentrated sulfuric acid with a blue to black coloration.

4. As a new article of manufacture, the herein-described disazo dyestuffs derived from the tetrazo derivative of the diamidophenol (OH:NH$_2$:NH$_2$ = 1:2:4), 1:4 naphthol-sulfonic acid and beta-naphthol, which dyes wool in an acid-bath brownish-violet tints turning on the treatment with chromium compounds to a deep violet-black very fast to milling, washing, potting and light, and constitutes in dry state a dark powder with bronze-like luster, soluble in water with a bluish-violet color and in concentrated sulfuric acid with a dark-blue color.

In testimony whereof I have hereunto signed my name, this 21st day of December, 1905, in the presence of two subscribing witnesses.

THILO KROEBER.

Witnesses:
GEO. GIFFORD,
AMAND RITTER.